US012762895B2

(12) United States Patent
Terashima

(10) Patent No.: US 12,762,895 B2
(45) Date of Patent: Oct. 13, 2026

(54) NON-TRANSITORY COMPUTER READABLE MEDIUM, INFORMATION PROCESSING DEVICE, AND COMPUTER-IMPLEMENTED METHOD FOR ESTIMATING REVOLUTIONS

(71) Applicant: CaTe Inc., Tokyo (JP)

(72) Inventor: Kazuhiro Terashima, Tokyo (JP)

(73) Assignee: CaTe Inc., Tokyo (JP)

( * ) Notice: Subject to any disclaimer, the term of this patent is extended or adjusted under 35 U.S.C. 154(b) by 254 days.

(21) Appl. No.: 18/686,431

(22) PCT Filed: Aug. 22, 2022

(86) PCT No.: PCT/JP2022/031632

§ 371 (c)(1),
(2) Date: Feb. 26, 2024

(87) PCT Pub. No.: WO2023/027046

PCT Pub. Date: Mar. 2, 2023

(65) Prior Publication Data

US 2024/0355141 A1 Oct. 24, 2024

(30) Foreign Application Priority Data

Aug. 26, 2021 (JP) ................................ 2021-137960

(51) Int. Cl.
*G06V 40/20* (2022.01)
*G06V 20/40* (2022.01)

(52) U.S. Cl.
CPC .............. *G06V 40/20* (2022.01); *G06V 20/41* (2022.01)

(58) Field of Classification Search
CPC ........ G06V 40/20; G06V 20/41; G06V 10/34; G06V 40/23; A61B 5/1128; A61B 5/11; A61B 5/22; A61B 5/7267; G06T 7/00; G06T 7/20; A63B 69/00; A63B 71/06; G06N 3/045; G06N 3/08; G06N 3/082;
(Continued)

(56) References Cited

U.S. PATENT DOCUMENTS 4,526,036 A * 7/1985 Morrison .............. G01P 15/121
73/514.12
10,842,415 B1 * 11/2020 Jagannathan ........ A61B 5/7264
(Continued)

FOREIGN PATENT DOCUMENTS

CN 108114405 A 6/2018
JP 2001017565 A 1/2001
(Continued)

OTHER PUBLICATIONS

Dian Gong et al., Structured Time Series Analysis for Human Action Segmentation and Recognition, IEEE Transactions on Pattern Analysis and Machine Intelligence, Jul. 2014, pp. 1414-1427, vol. 36, No. 7, XP011551861.

(Continued)

*Primary Examiner* — Kathleen Y Dulaney
(74) *Attorney, Agent, or Firm* — KENJA IP LAW PC

(57) ABSTRACT

A program according to an aspect of the present disclosure causes a computer to function as means for acquiring a user video of a user exercising, and means for making an estimation regarding the number of leg revolutions of the user based on the user video.

12 Claims, 8 Drawing Sheets

(58) Field of Classification Search
CPC .......... G06N 3/084; G06N 3/09; G06N 20/00; G16H 20/30; G16H 40/63; G16H 50/70
USPC ........................ 382/181, 100; 482/57; 73/493
See application file for complete search history.

(56) References Cited

U.S. PATENT DOCUMENTS

| | | | | |
|---|---|---|---|---|
| 2013/0065733 A1* | 3/2013 | Kautz | A63B 22/0605 482/57 |
| 2015/0146918 A1* | 5/2015 | Lin | H04N 7/18 382/103 |
| 2016/0166880 A1* | 6/2016 | Nakajima | G06Q 10/0639 434/247 |
| 2017/0115319 A1* | 4/2017 | Ookubo | B62J 45/20 |
| 2021/0225195 A1* | 7/2021 | Shteren | G16H 20/30 |

FOREIGN PATENT DOCUMENTS

| | | |
|---|---|---|
| JP | 2007500547 A | 1/2007 |
| JP | 2019025134 A | 2/2019 |
| JP | 2019071963 A | 5/2019 |
| WO | 2015108700 A1 | 7/2015 |
| WO | 2020218368 A1 | 10/2020 |
| WO | 2021132426 A1 | 7/2021 |

OTHER PUBLICATIONS

Jul. 7, 2025, the Extended European Search Report issued by the European Patent Office in the corresponding European Patent Application No. 22861334.5.

Oral Kaplan et al., Video-based Visualization of Knee Movement in Cycling for Quantitative and Qualitative Monitoring, 2019 12th Asia Pacific Workshop on Mixed and Augmented Reality (APMAR), 2019, IEEE, XP033547232.

Nov. 1, 2022, International Search Report issued in the International Patent Application No. PCT/JP2022/031632.

* cited by examiner

FIG. 5

| Labeled dataset | | |
|---|---|---|
| Sample ID | Input data | Correct data |
| | Skeleton | Number of leg revolutions |
| S001 | • | • |
| S002 | • | • |
| • | • | • |

FIG. 8

| Labeled dataset | | | |
|---|---|---|---|
| Sample ID | Input data | | Correct data |
| | Skeleton | Health status | Number of leg revolutions |
| S001 | · | · | · |
| S002 | · | · | · |
| · | · | · | · |

NON-TRANSITORY COMPUTER READABLE MEDIUM, INFORMATION PROCESSING DEVICE, AND COMPUTER-IMPLEMENTED METHOD FOR ESTIMATING REVOLUTIONS

TECHNICAL FIELD

The present disclosure relates to a program, an information processing device, and an information processing method.

BACKGROUND

Aerobic exercise plays a central role in, for example, diet, exercise therapy in cardiac rehabilitation, and the like. Exercise activities that fall under aerobic exercise are known to include fitness biking, jogging, walking, swimming, aerobic dancing, and the like. In particular, fitness bikes have advantages such as being possible to set up even in limited space in the home and being less stressful on the knees. Users of fitness bikes are able to perform a similar exercise to cycling by pedaling with their legs. The number of leg revolutions of a user is one evaluation metric of exercise load of a user of a fitness bike.

Patent Literature (PTL) 1 describes changing the content of an image displayed on head-mounted display (HMD), based on information based on rotational operation of a pedal by an operator. PTL 1 describes a magnetic detection element in a pedal device that detects revolutions per unit time of the pedal and outputs a detection result to an information processing device.

CITATION LIST

Patent Literature

PTL 1: JP 2019-071963 A

SUMMARY

Technical Problem

The technology of PTL 1 is premised on application to a pedal device equipped with means for detecting rotation, such as a magnetic detection element, and means for outputting the results of rotation detection to an information processing device. That is, PTL 1 does not consider how to obtain information on the number of leg revolutions of a user for a typical fitness bike that is not equipped with such means.

It would be helpful to provide estimation regarding the number of revolutions of the human leg under a variety of circumstances.

Solution to Problem

A program according to an aspect of the present disclosure causes a computer to function as means for acquiring a user video of a user exercising, and means for making an estimation regarding the number of leg revolutions of the user based on the user video.

Advantageous Effect

According to the present disclosure, an estimation regarding the number of revolutions of the human leg may be made under a variety of circumstances.

BRIEF DESCRIPTION OF THE DRAWINGS

In the accompanying drawings:

FIG. 5 is a diagram illustrating data structure of a labeled dataset according to an embodiment;

FIG. 8 is a diagram illustrating data structure of a labeled dataset according to Variation 1.

DETAILED DESCRIPTION

Figure 1:
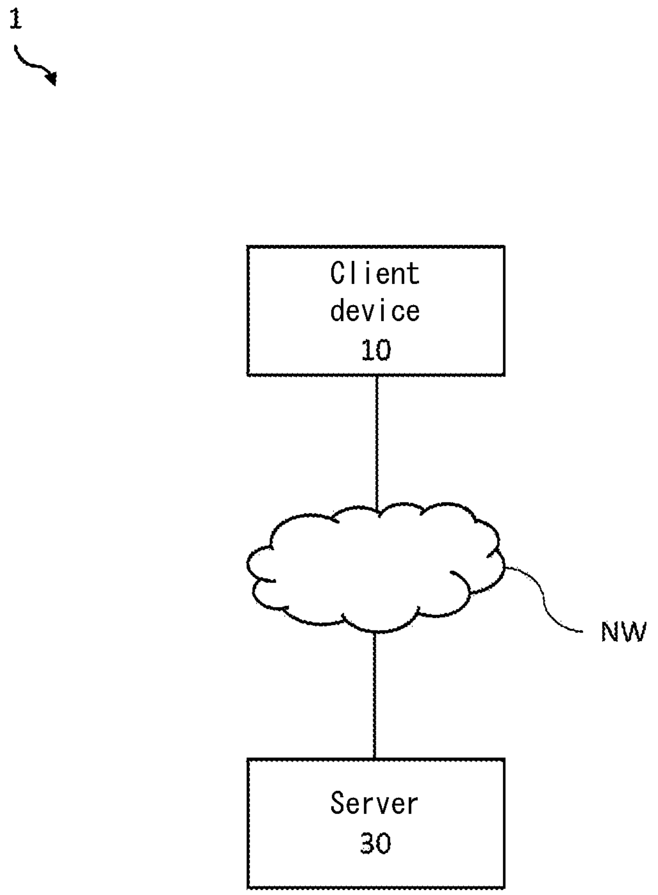
FIG. 1 is a block diagram illustrating a configuration of an information processing system according to an embodiment.

The following is a detailed description of an embodiment of the present disclosure, with reference to the drawings. In the drawings used in description of the embodiment, the same components are, in principle, marked with the same reference sign, and repeated explanations of the same components are omitted.

(1) Configuration of Information Processing System

The configuration of the information processing system is described below. FIG. 1 is a block diagram illustrating a configuration of the information processing system according to the present embodiment.

As illustrated in FIG. 1, the information processing system 1 includes a client device 10 and a server 30.

The client device 10 and the server 30 are connected via a network (for example, the Internet or an intranet) NW.

The client device 10 is an example of an information processing device that transmits requests to the server 30. The client device 10 is, for example, a smartphone, a tablet device, or a personal computer.

The server 30 is an example of an information processing device that provides responses to the client device 10 in response to requests sent by the client device 10. The server 30 is, for example, a web server.

(1-1) Configuration of Client Device

Figure 2:
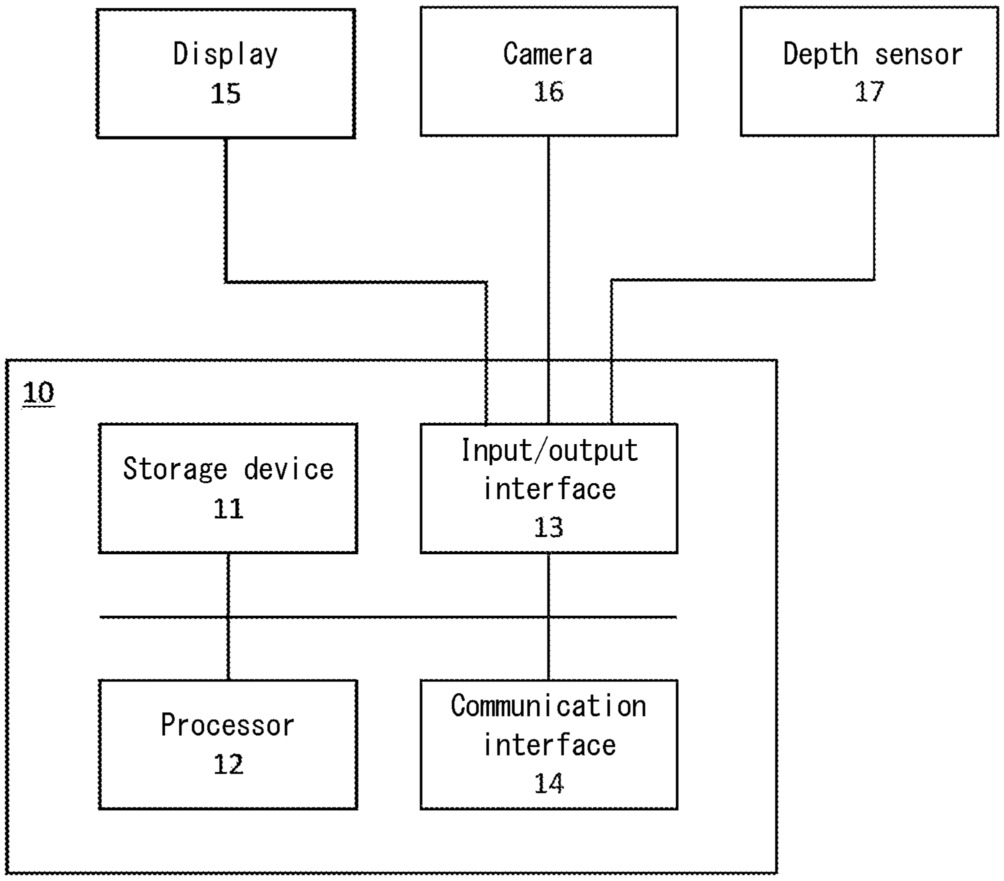
FIG. 2 is a block diagram illustrating a configuration of a client device according to an embodiment.

The configuration of the client device is described below. FIG. 2 is a block diagram illustrating the configuration of the client device according to the present embodiment.

As illustrated in FIG. 2, the client device 10 includes a storage device 11, a processor 12, an input/output interface 13, and a communication interface 14. The client device 10 is connected to a display 15, a camera 16, and a depth sensor 17.

The storage device 11 is configured to store programs and data. The storage device 11 is, for example, a combination of read-only memory (ROM), random access memory (RAM), and storage (for example, flash memory or a hard disk).

Programs include, for example, the following programs:

an operating system (OS) program an application program that executes information processing (for example, a web browser, a rehabilitation application, or a fitness application)

Data includes, for example, the following data:

a database referenced in information processing data obtained by executing information processing (that is, a result of executing information processing)

The processor 12 is a computer that realizes functions of the client device 10 by activating a program stored in the storage device 11. The processor 12 is, for example, at least one of the following:

a central processing unit (CPU)

a graphics processing unit (GPU)

an application specific integrated circuit (ASIC)

a field programmable gate array (FPGA)

The input/output interface 13 is configured to acquire information (for example, user instructions, images, audio) from an input device connected to the client device 10 and to output information (for example, images, commands) to an output device connected to the client device 10.

The input device is, for example, the camera 16, the depth sensor 17, a microphone, a keyboard, a pointing device, a touch panel, a sensor, or a combination thereof.

The output device is, for example, the display 15, a speaker, or a combination thereof.

The communication interface 14 is configured to control communication between the client device 10 and an external device (for example, the server 30).

Specifically, the communication interface 14 may include a module for communication with the server 30 (for example, a WiFi module, a mobile communication module, or a combination thereof).

The display 15 is configured to display images (still images or video). The display 15 is, for example, a liquid crystal display or an organic electroluminescence display.

The camera 16 is configured to capture images and generate image signals.

The depth sensor 17 is, for example, a light detection and ranging (LIDAR) sensor. The depth sensor 17 is configured to measure distance (depth) from the depth sensor 17 to a surrounding object (for example, a user).

(1-2) Configuration of Server

Figure 3:
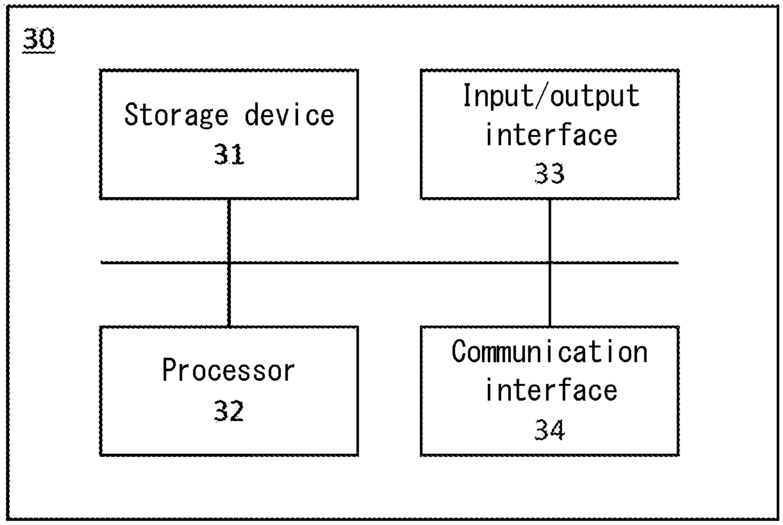
FIG. 3 is a block diagram illustrating a configuration of a server according to an embodiment.

The configuration of the server is described below. FIG. 3 is a block diagram illustrating the configuration of the server according to the present embodiment.

As illustrated in FIG. 3, the server 30 includes a storage device 31, a processor 32, an input/output interface 33, and a communication interface 34.

The storage device 31 is configured to store programs and data. The storage device 31 is, for example, a combination of ROM, RAM, and storage.

Programs include, for example, the following programs:

an OS program an application program that executes information processing

Data includes, for example, the following data:

a database referenced in information processing a result of executing information processing The processor 32 is a computer that realizes functions of the server 30 by activating a program stored in the storage device 31. The processor 32 is, for example, at least one of the following:

CPU

GPU

ASIC

FPGA

The input/output interface 33 is configured to acquire information (for example, user instructions) from an input device connected to the server 30 and to output information to an output device connected to the server 30.

The input device is, for example, a keyboard, a pointing device, a touch panel, or a combination thereof.

The output device is, for example, a display.

The communication interface 34 is configured to control communication between the server 30 and an external device (for example, the client device 10).

(2) Embodiment Overview

Figure 4:
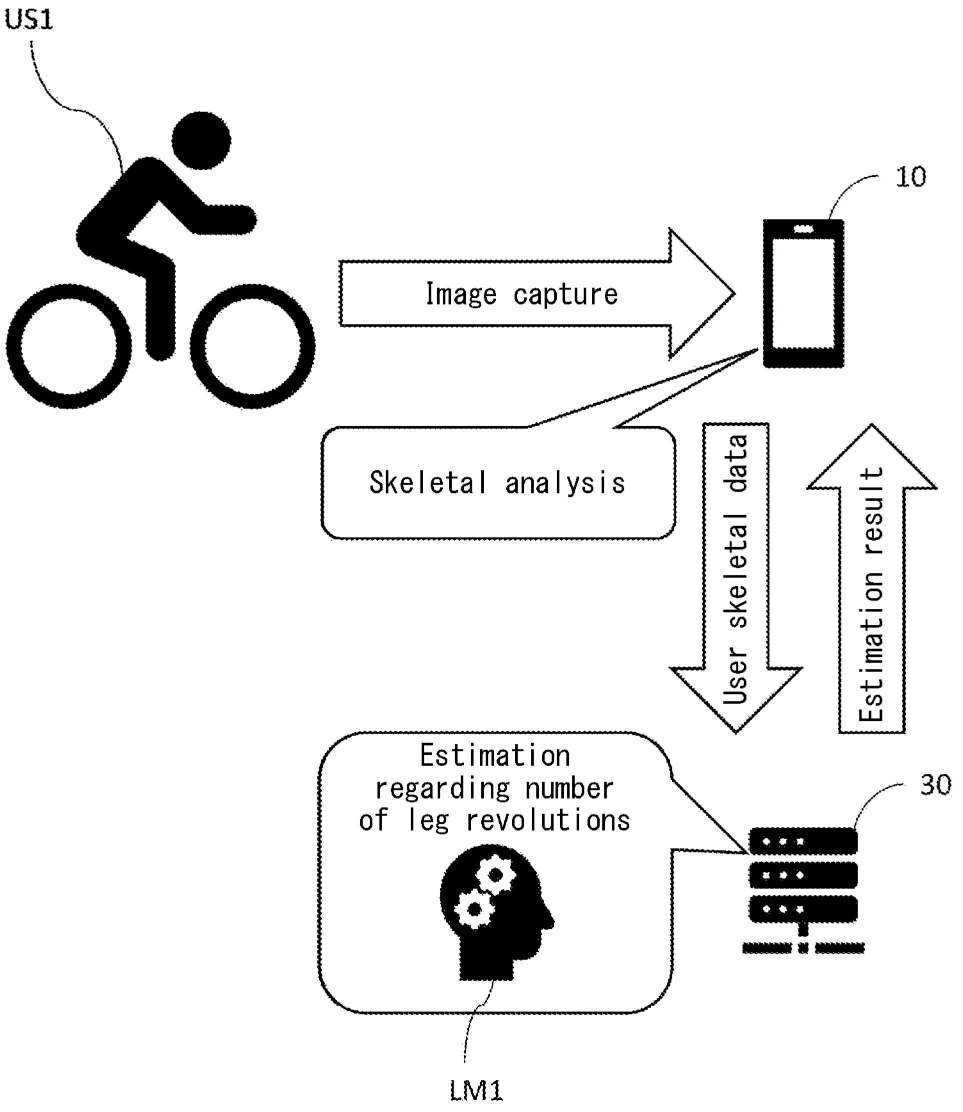
FIG. 4 is a diagram for explanation of an overview of an embodiment.

An overview of the present embodiment is described below. FIG. 4 is a diagram for explanation of the overview of the present embodiment.

As illustrated in FIG. 4, the camera 16 of the client device 10 image captures the appearance (for example, the whole body) of a user US1 during exercise. Although the example in FIG. 4 illustrates the user US1 performing pedaling exercise (for example, on a fitness bike, an ergometer, or a bicycle), the user US1 may perform any exercise (aerobic exercise or anaerobic exercise) that involves leg revolutions (that is, cyclical movement).

As an example, the camera 16 image captures the appearance of the user US1 from the front or from an angle. The depth sensor 17 measures distance (depth) from the depth sensor 17 to each part of the user US1. Three-dimensional video data may be generated by combining video data (two-dimensional) generated by the camera 16 with depth data generated by the depth sensor 17, for example.

The client device 10 at least refers to the video data acquired from the camera 16 to analyze the user's skeleton during exercise. The client device 10 may further refer to depth data acquired from the depth sensor 17 to better analyze the user's skeleton during exercise. The client device 10 transmits data regarding the skeleton of the user US1 during exercise (hereinafter also referred to as "user skeletal data") based on an analysis result of the video data (or the video data and the depth data) to the server 30.

The server 30 makes an estimation regarding the number of leg revolutions of the user US1 by applying a trained model LM1 (an example of an "estimation model") to the user skeletal data acquired. The server 30 transmits an estimation result (for example, a numerical value indicating the number of leg revolutions of the user US1 per unit time) to the client device 10.

In this way, the information processing system 1 makes an estimation regarding the number of leg revolutions of the user US1 based on the video (or video and depth) of the user US1 during exercise. Therefore, according to the information processing system 1, the number of leg revolutions of the user US1 may be estimated even when the user US1 exercises using training equipment that is not equipped with means for detecting the number of leg revolutions or means for outputting a detection result. That is, an estimation regarding the number of revolutions of the human leg may be made under a variety of circumstances.

(3) Labeled Dataset

The labeled dataset according to the present embodiment is described below. FIG. 5 is a diagram illustrating data structure of the labeled dataset according to the present embodiment.

As illustrated in FIG. 5, the labeled dataset includes labeled data. The labeled data is used to train or evaluate a target model. The labeled data includes sample IDs, input data, and correct data.

The sample IDs are information that identifies the labeled data.

The Input data is data that is input to the target model during training or evaluation. The input data corresponds to example problems used during training or evaluation of the target model. As an example, input data includes skeletal data of a subject. The skeletal data of the subject is data (for example, feature values) regarding the subject's skeleton during exercise.

The subject may be the same person or a different person from the user for whom the estimation regarding the number of leg revolutions is made during operation of the information processing system 1. By making the subject and user the same person, the target model may learn the user's traits and improve estimation precision. On the other hand, allowing the subject to be different from the user has the advantage of making it easier to enrich the labeled dataset. Further, the subject may consist of a plurality of people, including the user, or a plurality of people without the user.

Skeletal data includes, for example, data on the speed or acceleration of various parts of the subject (which may include data on changes in the parts of muscles used by the subject or on fluctuations of the subject's physical state).

At least part of the skeletal data may be obtained by analyzing the subject's skeleton during exercise with reference to subject video data (or subject video data and subject depth data). As an example, Vision, the software development kit (SDK) of iOS® (iOS is a registered trademark in Japan, other countries, or both) 14, or other skeletal detection algorithms are available for skeletal analysis. Skeletal data for the labeled dataset may be acquired, for example, by having the subject perform an exercise with motion sensors attached to each part of the subject.

Subject video data is data regarding a subject video of the subject during exercise. A subject video is typically a video of the subject so that at least the subject's lower body (specifically, the subject's legs) is included in an image capture range. Subject video data may be obtained, for example, by capturing the subject's appearance (for example, whole body) during exercise from the front or an angle from the front (for example, 45 degrees forward) with a camera (as an example, a camera mounted on a smartphone).

Subject depth data is data regarding distance (depth) from the depth sensor to each part of the subject (typically the legs) during exercise. Subject depth data may be acquired by operation of the depth sensor during image capture of a subject video.

Correct data is data corresponding to a correct answer to corresponding input data (example problem). The target model is trained to produce output closer to the correct data with respect to the input data (supervised training). As an example, the correct data includes at least one of the following: an evaluation metric of the number of leg revolutions, or a metric as material for determining the evaluation metric. As an example, an evaluation metric of number of leg revolutions may include at least one of the following:

- cumulative number of revolutions
- number of revolutions per unit time (that is, rotational speed)
- time derivative of rotational speed (that is, rotational acceleration)

However, the metric of number of leg revolutions may be any metric for quantitatively ascertaining leg revolutions (that is, cyclical movement), and is not limited to the metrics illustrated here. The metric of number of leg revolutions may include distance traveled (product of cumulative number of revolutions (cadence) and distance traveled per pedal revolution) and a metric that is calculable based on the above metric, such as exercise load.

Exercise load is a metric for quantitatively evaluating the load of exercise. Exercise load may be expressed numerically using at least one of the following:

- energy (calorie) consumption
- oxygen consumption
- heart rate

Correct data may be acquired, for example, by actually measuring the number of leg revolutions of the subject during subject video image capture by an appropriate sensor (for example, a cadence sensor). Correct data may be acquired by having the subject exercise with a motion sensor (for example, an accelerometer) attached to a leg and using a defined algorithm or trained model to make an estimation regarding the number of leg revolutions of the subject based on a sensing result from the motion sensor. Correct data may be provided by a human viewing a subject video and measuring the number of leg revolutions of the subject.

(4) Estimation Model

The estimation model used by the server 30 corresponds to a trained model created by supervised training using a labeled dataset (FIG. 5), or a derived model or distillation model of the trained model.

(5) Information Processing

Figure 6:
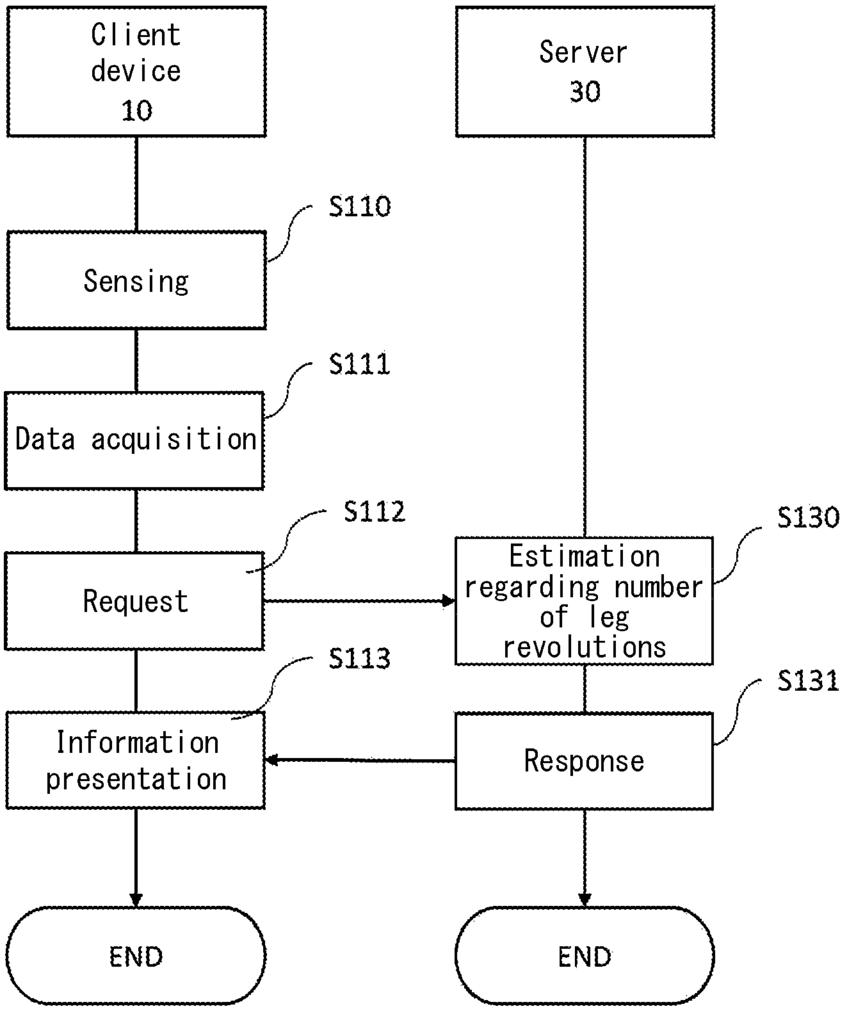
FIG. 6 is a flowchart of information processing according to an embodiment.
Figure 7:
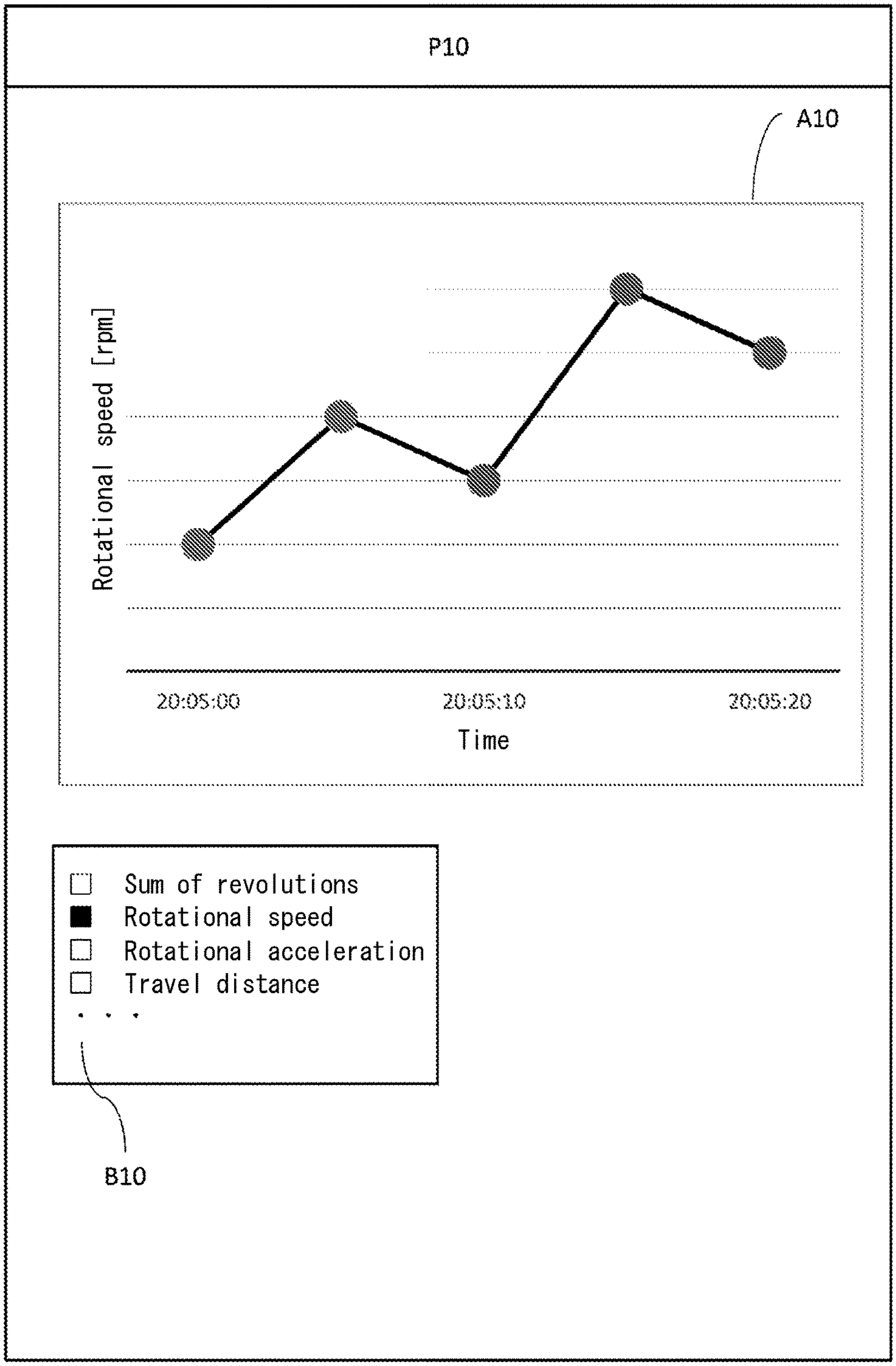
FIG. 7 is a diagram illustrating an example screen displayed in information processing according to an embodiment.

Information processing according to the present embodiment is described below. FIG. 6 is a flowchart of information processing according to the present embodiment. FIG. 7 is a diagram illustrating an example screen displayed in information processing according to the present embodiment.

Information processing starts, for example, upon fulfillment of any of the following start conditions.

- Information processing was called by another process.
- The user performed an operation to call information processing.
- The client device 10 is in a defined state (for example, starting a defined application).
- A defined date and time has arrived.
- A defined amount of time has elapsed since a defined event.

As illustrated in FIG. 6, the client device 10 executes sensing (S110).

Specifically, the client device 10 starts capturing video of the user during exercise (hereinafter also referred to as "user video") by enabling operation of the camera 16. A user video is typically a video of the user so that at least the user's lower body (specifically, the user's legs) is included in an image capture range.

Further, by enabling operation of the depth sensor 17, the client device 10 starts measuring distance from the depth sensor 17 to each part of the user during exercise (hereinafter also referred to as "user depth").

After step S110, the client device 10 executes data acquisition (S111).

Specifically, the client device 10 acquires the sensing results generated by various sensors enabled in step S110.

For example, the client device 10 acquires user video data from the camera 16 and user depth data from the depth sensor 17.

After step S111, the client device 10 executes a request (S112).

Specifically, the client device 10 references the data acquired in step S111 and generates a request. The client device 10 transmits the generated request to the server 30. The request may include, for example, at least one of the following:

- data acquired in step S111 (for example, user video data or user depth data)
- data processed from data acquired in step S111
- user skeletal data acquired by analyzing user video data (or user video data and user depth data) acquired in step S111

After step S112, the server 30 makes an estimation regarding the number of leg revolutions (S130).

Specifically, the server 30 acquires input data for the estimation model based on the request acquired from the client device 10. The input data includes user skeletal data as well as labeled data. The server 30 applies the estimation model to the input data to make an estimation regarding the number of leg revolutions of the user. As an example, the server 30 estimates at least one of the evaluation metrics for the number of leg revolutions of the user.

After step S130, the server 30 executes a response (S131).

Specifically, the server 30 generates the response based on a result of the estimation in step S130. The server 30 transmits the generated response to the client device 10. As an example, the response may include at least one of the following:

- data corresponding to a result of the estimation regarding the number of leg revolutions
- data processed from a result of the estimation regarding the number of leg revolutions (for example, data of a screen to be displayed on the display 15 of the client device 10, or data referenced to generate the screen)

The client device 10 executes information presentation (S113) after step S131.

Specifically, the client device 10 displays information on the display 15 based on the response acquired from the server 30 (that is, the result of the estimation regarding the number of leg revolutions of the user).

However, instead of or in addition to the user, information may be presented to an instructor of the user (for example, a medical professional or a trainer) on a terminal used by the instructor. Information may be presented as content that enhances the user's exercise experience (for example, scenery or video game footage controlled according to the result of estimation regarding number of leg revolutions). Such content may be presented via an external device display, such as an HMD or the like instead of the display 15.

As an example, the client device 10 displays a screen P10 (FIG. 7) on the display 15. The screen P10 includes a display object A10 and an operation object B10.

The operation object B10 accepts operations to specify evaluation metrics regarding the number of leg revolutions to be displayed on the display object A10. In the example in FIG. 7, the operation object B10 corresponds to check boxes.

The display object A10 displays change over time of a result of estimating the evaluation metric. In the example in FIG. 7, the display object A10 displays a graph illustrating change over time of a result of estimating rotational speed (rpm), the evaluation metric specified in the operation object B10, every 5 seconds.

When a plurality of evaluation metrics are specified in the operation object B10, the display object A10 may superimpose graphs illustrating change over time in the results of estimating the plurality of evaluation metrics, or may display such graphs individually.

After step S113, the client device 10 ends the information processing (FIG. 6). However, when the estimation regarding the number of leg revolutions of the user is executed in real time during the user's exercise, the client device 10 may return to data acquisition (S111) after step S113.

(6) Review

As described above, the information processing system 1 according to the embodiment makes an estimation regarding the number of leg revolutions of the user based on a video of the user during exercise. Therefore, the number of leg revolutions of the user may be estimated even when the user exercises using training equipment that is not equipped with means for detecting the number of leg revolutions or means for outputting a detection result. That is, an estimation regarding the number of revolutions of the human leg may be made under a variety of circumstances.

The information processing system 1 may make an estimation regarding the number of leg revolutions of the user by applying the estimation model to input data based on video of the user during exercise. This allows for a quick statistical estimate of the number of leg revolutions of the user. Further, the estimation model may correspond to a trained model created by supervised training using the labeled dataset (FIG. 5), or a derived model or distillation model of the trained model. This allows for efficient construction of the estimation model. The input data to which the estimation model is applied may include data regarding the user's skeleton during exercise. This improves precision of the estimation model. The input data to which the estimation model is applied may include data about depth from a reference point (that is, the depth sensor 17) to each part of the user (that is, user depth data) at the time a user video was captured. This improves precision of the estimation model.

The information processing system 1 may estimate at least one of the following: cumulative number of leg revolutions, rotational speed, rotational acceleration, or travel distance converted from the cumulative number of leg revolutions. This allows for appropriate evaluation of the number of leg revolutions of the user (which may include real time revolutions).

The user video may be a video of the user so that at least the user's lower body (preferably the user's legs) is included in the image capture range. This improves precision of the estimation model.

The user video may be a video of a user pedaling. This improves precision of the estimation model.

The information processing system 1 may present information based on a result of the estimation regarding the number of leg revolutions of the user. This allows the user, or their instructor, to be informed about the number of leg revolutions of the user and to control content (for example, scenery or video game footage) to enhance the user's exercise experience. As a first example, the information processing system 1 may present an evaluation metric of the number of leg revolutions of the user. This allows the recipient of the information to appropriately ascertain the number of leg revolutions of the user. As a second example, the information processing system 1 may present information regarding change over time of the evaluation metric of the number of leg revolutions of the user. This allows the recipient of the information to ascertain changes over time in the number of leg revolutions of the user.

(7) Variation 1

Variation 1 is described below. Variation 1 is an example of variation in the input data with respect to the estimation model.

(7-1) Overview of Variation 1

An overview of Variation 1 is described below. The embodiment described above illustrates an example of application of an estimation model to input data based on a user video. Variation 1 is an example of making an estimation regarding the number of leg revolutions of the user by applying an estimation model to input data based on both a user video and health status of the user.

Health status includes at least one of the following:

- age
- gender
- height
- body weight
- body fat percentage
- muscle mass
- bone density
- history of present illness
- past medical history
- oral medication history
- surgical history
- life history (for example, smoking history, alcohol consumption history, activities of daily living (ADL), frailty score, and the like)
- family history
- results of respiratory function tests.
- results of tests other than respiratory function tests (for example, results of blood tests, urinalysis, electrocardiograhy (including Holter electrocardiograms), echocardiography, X-ray tests, computed tomography (CT) scans (including cardiac CT and coronary artery CT), magnetic resonance imaging (MRI), nuclear medicine tests, positron emission tomography (PET) tests, and the like)
- data acquired during cardiac rehabilitation (including Borg index)

(7-2) Labeled Dataset

The labeled dataset according to Variation 1 is described below. FIG. 8 is a diagram illustrating data structure of a labeled dataset according to Variation 1.

As illustrated in FIG. 8, the labeled dataset of Variation 1 includes labeled data. The labeled data is used to train or evaluate a target model. The labeled data includes sample IDs, input data, and correct data.

The sample IDs and correct data are as described with respect to the embodiment described above.

The Input data is data that is input to the target model during training or evaluation. The input data corresponds to example problems used during training or evaluation of the target model. As an example, the input data is the subject's skeletal data (that is, relatively dynamic data) and data regarding the health status of the subject (that is, relatively static data). The subject's skeletal data is as described with respect to the embodiment described above.

Data regarding the health status of the subject may be acquired in a variety of ways. Data regarding the health status of the subject may be acquired at any time during, before, or after exercise by the subject (including at rest). Data regarding the health status of the subject may be acquired based on a report from the subject or their physician, may be acquired by extracting information associated with the subject from a medical information system, or may be acquired via a software application of the subject (for example, a healthcare application).

(7-3) Estimation Model

According to Variation 1, the estimation model used by the server 30 corresponds to a trained model created by supervised training using a labeled dataset (FIG. 8), or a derived model or a distillation model of the trained model.

(7-4) Information Processing

Information processing according to Variation 1 is described with reference to FIG. 6.

According to Variation 1, the client device 10 executes sensing (S110) as in FIG. 6.

After step S110, the client device 10 executes data acquisition (S111).

Specifically, the client device 10 acquires the sensing results generated by various sensors enabled in step S110. For example, the client device 10 acquires user video data from the camera 16 and user depth data from the depth sensor 17.

Further, the client device 10 acquires data on the health status of the user (hereinafter also referred to as "user health status data"). For example, the client device 10 may acquire user health status data based on an operation (report) by the user or their physician, may acquire user health status data by extracting information associated with the user from a medical information system, or may acquire user health status data via a software application of the user (for example, a healthcare application). However, the client device 10 may acquire the user health status data at a timing different from step S111 (for example, before step S110, at the same timing as step S110, or after step S111).

After step S111, the client device 10 executes a request (S112).

Specifically, the client device 10 references the data acquired in step S111 and generates a request. The client device 10 transmits the generated request to the server 30. The request may include, for example, at least one of the following:

- data acquired in step S111 (for example, user video data, user depth data, or user health status data)
- data processed from data acquired in step S111
- user skeletal data acquired by analyzing user video data (or user video data and user depth data) acquired in step S111

After step S112, the server 30 makes an estimation regarding the number of leg revolutions (S130).

Specifically, the server 30 acquires input data for the estimation model based on the request acquired from the client device 10. The input data includes user skeletal data and user health status data as well as labeled data. The server 30 applies the estimation model to the input data to make an estimation regarding the number of leg revolutions. As an example, the server 30 estimates at least one of the evaluation metrics for the number of leg revolutions of the user.

After step S130, the server 30 executes the response (S131), as in FIG. 6.

After step S131, the client device 10 executes information presentation (S113), as in FIG. 6.

(7-5) Review

As described above, the information processing system 1 according to Variation 1 executes estimation regarding the number of leg revolutions of the user by applying the estimation model to the input data based on both the user video and the health status of the user. This allows for highly precise estimation by further taking into account the health status of the user. For example, a reasonable estimate may be made even when there are differences between the health status of the user and the health status of the subject on whom the labeled data was based.

(8) Other Variations

The storage device 11 may be connected to the client device 10 via the network NW. The display 15 may be built into the client device 10. The storage device 31 may be connected to the server 30 via the network NW.

Examples of implementing the information processing system according to an embodiment and Variation 1 by a client/server type system are illustrated. However, the information processing system of the embodiment and Variation 1 may be implemented by a stand-alone computer. As an example, the client device 10 alone may make an estimation regarding the number of leg revolutions using the estimation model.

Each step of the information processing may be performed by the client device 10 or the server 30. As an example, instead of the client device 10, the server 30 may obtain user skeletal data by analyzing a user video (or user video and user depth).

The above description illustrates an example of capturing user video using the camera 16 of the client device 10. However, the user video may be captured using a different camera than the camera 16. An example of measuring user depth using the depth sensor 17 of the client device 10 is illustrated. However, user depth may be measured using a different depth sensor than the depth sensor 17.

The information processing system 1 according to the embodiment and Variation 1 may be applied to a video game in which game progress is controlled according to a player's body movements (for example, number of leg revolutions). As an example, the information processing system 1 may make an estimation regarding the number of leg revolutions of the user during game play and determine one of the following according to a result of the estimation. This may enhance an effect provided by the video game for improving the user's health:

- a quality (for example, difficulty) or quantity of video game-related challenges (for example, stages, missions, quests) provided to the user
- a quality (for example, type) or quantity of video game-related benefits (for example, in-game currency, items, bonuses) provided to the user A microphone mounted on the client device 10 or connected to the client device 10 may receive sound waves emitted from the user during image capture of a user video (that is, during user exercise) and generate sound data. Sound data, together with user skeletal data, may constitute input data with respect to the estimation model. Sound emitted from the user is, for example, at least one of the following:

- sound waves produced by revolution of the user's legs (for example, from the pedals or a drive connected to the pedals)
- sound produced by the user's breathing or speech Acceleration data may be used as part of the input data with respect to the estimation model. The user's skeleton may be analyzed with reference to acceleration data. Acceleration data may be obtained, for example, by having the user carry or wear the client device 10 or a wearable device including an accelerometer on the user during image capture of a user video (that is, during user exercise).

The above description illustrates leg revolutions due to pedaling. However, leg revolution is not limited to circular motions such as pedaling, and may include all periodic motions such as stepping. In short, the number of leg revolutions may be interpreted as the number footsteps or steps, as appropriate.

Variation 1 illustrates an example of applying an estimation model to input data based on health status. However, a plurality of estimation models may be constructed based on (at least part of) the health status of the subject. In this case, (at least part of) the health status of the user may be referenced to select an estimation model. According to this variation, the input data to the estimation model may be data that is not based on the health status of the user and may be data based on the health status of the user and a user video.

Although the embodiment and variations have been described in detail above, the scope of the present disclosure is not limited to the embodiment and variations described above. Further, the embodiment and variations described above may be improved or modified in various ways to an extent that does not depart from the spirit of the present disclosure. Further, the embodiment and variations described above may be combined.

REFERENCE SIGNS LIST

1: information processing system
10: client device
11: storage device
12: processor
13: input/output interface
14: communication Interface
15: display
16: camera
17: depth sensor
30: server
31: storage device
32: processor
33: input/output interface
34: communication Interface

The invention claimed is:

1. A non-transitory computer readable medium storing a program that causes a computer to perform operations comprising:

acquiring a user video of a user exercising, and depth data indicating a distance to the user detected by a depth sensor;

acquiring skeleton data of at least a lower body of the user based on the user video and the depth data; and making an estimation regarding a number of leg revolutions of the user based on analyzing the skeleton data.

2. A non-transitory computer readable medium according to claim 1, wherein making an estimation regarding the number of leg revolutions includes applying an estimation model to input data including the skeleton data.

3. A non-transitory computer readable medium according to claim 2, wherein the estimation model corresponds to a trained model created by supervised training using a labeled dataset containing training input data including data regarding a subject video of a subject exercising and correct data associated with each item of the training input data, or a derived model or a distillation model of the trained model.

4. A non-transitory computer readable medium according to claim 3, wherein making an estimation regarding the number of leg revolutions includes at least one of: cumulative number of leg revolutions, rotational speed, rotational acceleration, or travel distance converted from the cumulative number of leg revolutions.

5. A non-transitory computer readable medium according to claim 2, wherein making an estimation regarding the number of leg revolutions includes at least one of: cumulative number of leg revolutions, rotational speed, rotational acceleration, or travel distance converted from the cumulative number of leg revolutions.

6. A non-transitory computer readable medium according to claim 1, wherein making an estimation regarding the number of leg revolutions includes at least one of: cumulative number of leg revolutions, rotational speed, rotational acceleration, or travel distance converted from the cumulative number of leg revolutions.

7. A non-transitory computer readable medium according to claim 1, wherein the user video is a video of the user pedaling.

8. A non-transitory computer readable medium according to claim 1, wherein the operations further comprise presenting information based on a result of the estimation regarding the number of leg revolutions of the user.

9. A non-transitory computer readable medium according to claim 8, wherein making an estimation regarding the number of leg revolutions includes estimating an evaluation metric regarding the number of leg revolutions, and the operations further comprise presenting the evaluation metric.

10. A non-transitory computer readable medium according to claim 9, wherein presenting the evaluation metric includes presenting change over time of the evaluation metric.

11. An information processing device comprising: a memory storing instructions; and a processor configured to execute the instructions to perform operations comprising:

acquiring a user video of a user exercising and depth data indicating a distance to the user detected by a depth sensor;

acquiring skeleton data of at least a lower body of the user based on the user video and the depth data; and making an estimation regarding a number of leg revolutions of the user based on analyzing the skeleton data.

12. A computer-implemented method comprising acquiring, by a computer, a user video of a user exercising and depth data indicating a distance to the user detected by a depth sensor;

acquiring, by the computer, skeleton data of at least a lower body of the user based on the user video and the depth data; and making, by the computer, an estimation regarding a number of leg revolutions of the user based on analyzing the skeleton data.

* * * * *